(12) United States Patent
Peterson et al.

(10) Patent No.: US 7,360,565 B2
(45) Date of Patent: Apr. 22, 2008

(54) FUEL OVERFLOW PREVENTION DEVICE

(75) Inventors: Michael Peterson, Orono, ME (US);
Stephen Ergmann, York, ME (US);
Stefan Scarks, Saco, ME (US);
William Dow, Saco, ME (US)

(73) Assignee: University of Maine System, Orono, ME (US)

( * ) Notice: Subject to any disclaimer, the term of this patent is extended or adjusted under 35 U.S.C. 154(b) by 0 days.

(21) Appl. No.: 11/471,179

(22) Filed: Jun. 20, 2006

(65) Prior Publication Data

US 2007/0289664 A1    Dec. 20, 2007

(51) Int. Cl.
*B65B 1/04* (2006.01)
(52) U.S. Cl. .................. 141/326; 141/59; 141/285; 141/307
(58) Field of Classification Search ............ 141/44–46, 141/59, 285, 302, 307, 312, 326; 220/86.2, 220/203.29
See application file for complete search history.

(56) References Cited

U.S. PATENT DOCUMENTS

| | | | |
|---|---|---|---|
| 4,759,458 A * | 7/1988 | Fischer | 220/86.2 |
| 5,275,213 A | 1/1994 | Perkins | |
| 5,503,199 A | 4/1996 | Whitley, II et al. | |
| 5,507,324 A | 4/1996 | Whitley, II et al. | |
| 5,570,730 A * | 11/1996 | Keehn et al. | 141/59 |
| 5,829,491 A | 11/1998 | Bennett | |
| 5,878,795 A | 3/1999 | Armellino | |
| 5,894,809 A | 4/1999 | Grigaitis et al. | |
| 5,975,154 A | 11/1999 | Bennett | |
| 6,289,945 B1 | 9/2001 | Haboush, II | |
| 6,729,367 B2 | 5/2004 | Peterson | |
| 6,929,039 B2 | 8/2005 | Vaitses | |

OTHER PUBLICATIONS

Screens "Foundation Findings #40", (no date), http://www.boatus.com/foundation/findings40/vented.htm (4 pages).
Screens "Getting Rid of Nozzle Splashback", (no date), http://www.husky.com/apetnoz.htm (3 pages).

* cited by examiner

*Primary Examiner*—Timothy L. Maust
(74) *Attorney, Agent, or Firm*—Verrill Dana, LLP; Chris A. Caseiro

(57) ABSTRACT

A fuel overflow prevention device for minimizing or eliminating fuel spillage during fuel storage container filling. The device may also minimize or eliminate some types of fuel spillage after filling. The device includes an overflow prevention chamber for receiving therein fluid from a fuel storage container vent tube. The overflow prevention chamber also includes a space for removably receiving and retaining therein the spout of an automatic shutoff fuel nozzle including a sensor port. A flow restriction interface is established between an interior portion of the overflow prevention chamber and the exit port of the spout. Fluid received from the vent tube into the overflow prevention chamber fills the space until covering the sensor port to a level sufficient to trigger automatic nozzle shutoff. The device optionally includes a vent tube extension to aid in regulating the fuel level within the container at which nozzle shutoff is triggered.

17 Claims, 5 Drawing Sheets

FUEL OVERFLOW PREVENTION DEVICE

BACKGROUND OF THE INVENTION

1. Field of the Invention

The present invention relates to devices for minimizing or eliminating the hazards associated with fuel overflow. More particularly, the present invention relates to minimizing or eliminating fuel spillage associated with filling fuel storage containers including, but not limited to, watercraft fuel tanks.

2. Description of the Prior Art

It is well known to use storage tanks for holding a variety of fluids such as oil, gasoline, and diesel fuel to name a few. Proper filling of storage tanks is a universal concern, as overfilling of storage tanks may result in spillage, damage to the tank or filling equipment, contamination of land or ground water, or other serious and potentially dangerous results. Concerns over spillage of the tank contents are particularly acute when the tank contents are flammable, toxic and/or environmentally hazardous.

Spillage from fuel tanks on watercraft including, but not limited to, pleasure and small commercial fishing boats is particularly troublesome. Some contemporary estimates of such fuel spillage are in excess of six million gallons annually on the waterways of the United States alone. Globally, fuel spillage is many times this amount. The resultant fuel losses are economically and ecologically detrimental in terms of wasted fuel resources and environmental contamination. The problem has led the Environmental Protection Agency to mandate that any such spillage be subject to heavy fines.

The internal fuel tank of a watercraft is typically provided with a vent to enable vapor and fumes to escape under pressure while fuel is being pumped into the fuel tank via the fuel fill tube. As the engine consumes fuel, air is drawn into the tank via the air vent to fill the space from the consumed fuel. Venting is also necessary to accommodate expansion of the fuel when it is heated. During filling of the fuel tank, some fuel may be discharged through the vent into the water as the attendant attempts to fill the tank to capacity. In fact, it is not unknown for filling attendants to purposely fill the tank until fuel is discharged from the vent, using this as an indication that the tank is completely full. It is also possible that fuel may be discharged through the vent subsequent to filling. For example, fuel can be discharged through the vent in a tank filled to capacity as a result of the watercraft listing from side to side due to waves, wind or other causes. Also, fuel will be discharged through the vent in a tank filled to capacity if a subsequent rise in ambient temperature causes the fuel in the tank to expand.

The use of fuel dispensing nozzles that automatically shut off the flow of fuel can aid in avoiding or limiting fuel spillage during filling. The typical automatic shutoff nozzle includes a spout containing a vacuum tube in communication with a venturi near the nozzle handle. The vacuum tube terminates in a pressure sensor port near the exit end of the spout. The venturi is connected to a diaphragm, which diaphragm is coupled to a mechanical device that shuts off fuel flow through the nozzle. In operation, fuel flows through the venturi before passing out of the spout. The passage of fuel through the spout creates a vacuum and air is drawn into the sensor port, through the vacuum tube and into the venturi. An air flow balance is created within the nozzle and the diaphragm remains stationary. When fuel fills the tank and covers the sensor port, the air flow through the vacuum tube stops, a vacuum is created in the venturi by the fuel passing through it. The vacuum buildup in the venturi causes diaphragm movement, which triggers movement of the mechanical device resulting in nozzle shutoff. Unfortunately, automatic fuel shutoff may not occur at the desired time in all situations, including in regard to filling fuel tanks having vent tubes, such as in watercraft.

Specifically in regard to filling the fuel tank of a watercraft, both the fuel fill tube and the vent tube are open to atmospheric pressure and allow air to flow in and out freely during refueling. During the filling process, a turbulent mixture of fuel and air creates foam on the surface of the fuel in the tank. The foam covers the surface of the fuel and rises up into the fuel fill tube and the vent tube as the fuel in the tank rises. When the foam backs up through the fuel fill tube and reaches the sensor port of the fueling nozzle, its viscosity is insufficient at the sensor port to produce the vacuum buildup required in the venturi to trigger automatic nozzle shutoff. As fuel continues to enter the tank, the foaming fuel-air mixture passes into and through either or both of the fuel fill tube and the vent tube to the surrounding environment until such time as enough liquid fuel at the sensor port causes the pressure differential at the venturi required for shutoff.

It can be seen that current filling procedures and devices do not minimize or eliminate fuel overflow through at least the fuel fill tube, and possibly the vent tube, if the nozzle is not shut off manually. Moreover, as noted, discharge through the vent tube may occur even after triggering of automatic shutoff. For example, if the fuel tank is filled to near capacity, fuel can be discharged through the vent tube due to boat listing or fuel expansion.

Many prior approaches to spill prevention or minimization rely on the use of a relatively large reservoir designed to capture overflow. No serious attempt is made to improve the functionality of the automatic shut-off and the system still relies primarily on operator attention. However, the use of a reservoir consumes valuable space on the watercraft and may not address the problems associated with the fuel-air foam mixture when using automatic shutoff nozzles. As the number of automatic shutoff nozzles continues to increase, it is preferable to have an alternative solution for fuel spillage prevention and minimization than a substantial reservoir. Specifically, it would be useful to have a device to minimize or eliminate fuel spillage suitable for use with automatic shutoff nozzles.

Accordingly, there is a need for a device arranged to minimize or eliminate fuel spillage associated with a watercraft fuel tank both during and after filling of a storage tank. It would be desirable to have such a device that is compatible with the use of automatic shutoff fuel nozzles and that does not require provision of a substantial overflow reservoir. Further, it would be desirable to have such a device that is substantially compatible with existing watercraft fueling arrangements.

SUMMARY OF THE INVENTION

It is an object of the present invention to provide a device arranged to minimize or eliminate fuel spillage associated with a watercraft fuel tank both during and after filling of a storage tank. It is also an object of the present invention to provide such a device that is compatible with the use of automatic shutoff fuel nozzles and that does not require provision of an overflow reservoir. Further, it is an object of the present invention to provide such a device that is substantially compatible with existing watercraft fueling arrangements.

These and other objects are achieved with the present invention, which is a fuel overflow prevention device. The device includes an Overflow Prevention (OP) chamber arranged for attachment to a watercraft deck plate at or near the location of the watercraft's fuel fill tube for engagement therewith. The OP chamber includes a primary fill space sized to receive an automatic shutoff fuel nozzle. The OP chamber is arranged to include a tapered base configured to establish a flow restricting seal with the face of the nozzle. The OP chamber also includes a vent tube interface to establish a fluid conduit between the fuel tank and the primary fill space. That is, the OP chamber is coupled to the vent tube to receive vapors, fuel, and vapor/fuel mixture from the fuel tank rather than venting such fluids elsewhere. This arrangement ensures that fuel and fuel-air mixtures rising in the fuel tank enters the primary fill space first. When a sufficient amount of fuel enters the primary fill space, fuel covers or restricts air flow through the sensor port of the nozzle, triggering automatic cutoff of fuel entering the fuel tank.

The arrangement of the OP chamber ensures that foaming fuel is directed to the primary fill space rather than vented to the environment. In addition, the foaming fuel accumulates in liquid form within the primary fill space until enough exists to cover the sensor port. Therefore, excess filling is prevented and no fuel exits from the fuel fill tube.

The device of the present invention further includes an optional vent tube extension. The vent tube extension is arranged for attachment to the fuel tank at or near the location of the watercraft's vent tube for engagement therewith. The vent tube extension is removably attached to the vent tube and extends into the fuel tank to a selectable distance. That distance is dependent upon the amount of empty space desired within the fuel tank above the stored fuel. This allows the amount of open space at the tank to be adjusted to allow expansion of the fuel due to an increase in temperature. That is, the vent tube extension is arranged to include a fuel interface port positioned such that when fuel or fuel-air foam mixture contacts it, the fuel or foam mixture passes through the vent tube into the primary fill space of the OP chamber. Effectively, fuel flow is automatically shut off when the fuel or an adequate amount of fuel-air foam mixture enters the vent tube extension. The location of the fuel interface port is selectable based upon anticipated fuel expansion characteristics, fuel sloshing within the tank, a combination thereof, or other factors.

The device of the present invention further includes an optional evaporative emissions canister interface. Evaporative emissions canisters are arranged to capture fuel vapors from one or more locations of the watercraft, including the fuel tank. These vapors will continue to be released due to evaporation of the fuel in the tank. Currently, in those systems having an evaporative emissions canister, vapors from within the fuel tank pass to the canister via the vent tube. Since the present invention is coupled to the vent tube, the OP chamber includes an evaporative emissions canister interface for those systems having an evaporative emissions canister. The interface allows vapors accumulating in the fuel tank to continue to pass through the vent tube to the evaporative emissions canister, but they pass from the vent tube through the OP chamber to the canister. It is understood that such canisters may become obligatory systems on watercraft. The OP chamber is arranged to engage with such systems with the optional evaporative emissions canister interface.

The fuel overflow prevention device with OP chamber of the present invention is arranged to minimize or eliminate fuel overflow associated with watercraft fueling. It may also be suitable in non-watercraft applications including, for example, stationary oil tanks, but it is not limited thereto. The OP chamber captures fuel and fuel-air foam mixtures from the vent tube and causes that fuel and/or foam mixture to trigger automated nozzle shutoff before fuel spillage can occur. These and other advantages of the marine fuel overflow prevention device will become apparent upon review of the following detailed description, the accompanying drawings, and the appended claims.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE PREFERRED EMBODIMENT OF THE INVENTION

Figure 1:
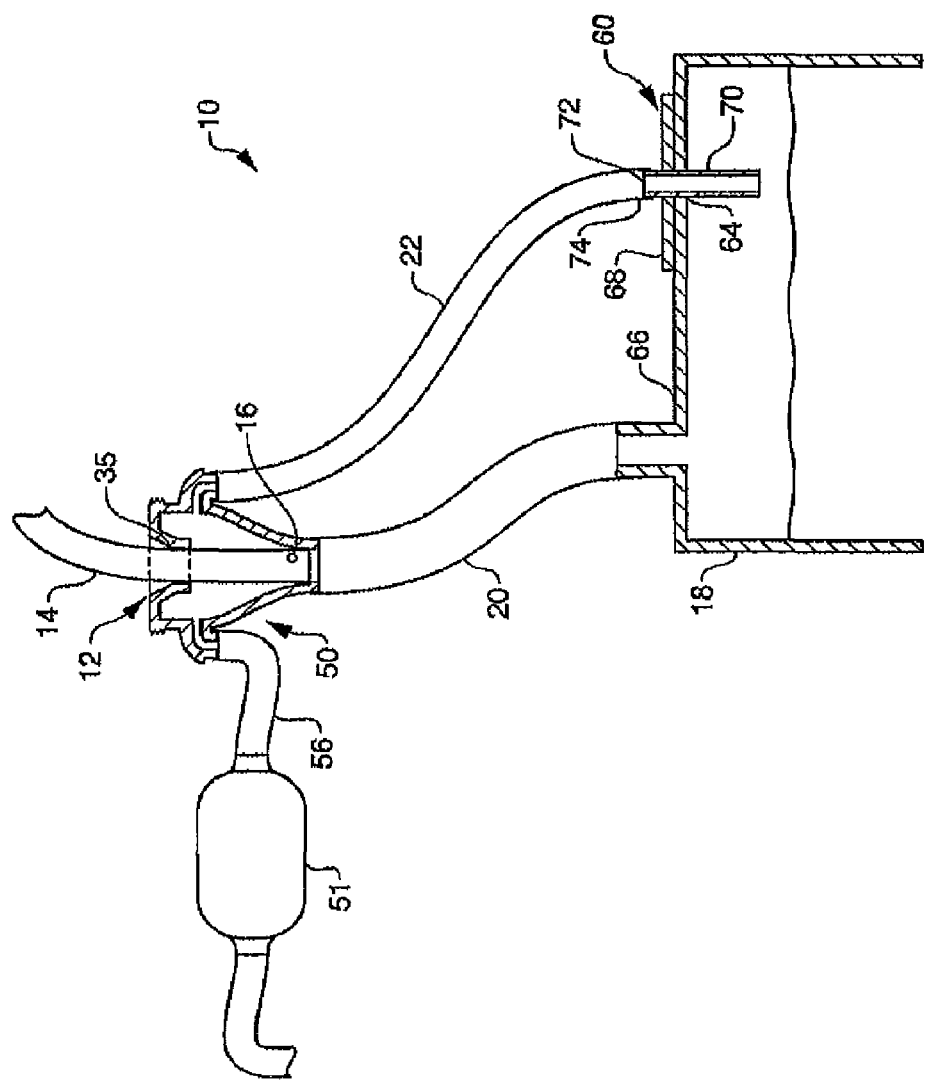
FIG. 1 is a cross-sectional side view of the fuel overflow prevention device of the present invention shown connected to a fuel storage container fill tube, vent tube, and evaporative emissions canister.

A fuel overflow prevention device 10 of the present invention is shown in context in FIG. 1. The device 10 includes an Overflow Prevention (OP) chamber 12. The OP chamber 12 is arranged to receive and removably retain therein a spout 14 of an automatic shutoff fueling nozzle. The fueling nozzle may be of any type generally available at fueling stations, but for the purposes of the present invention, it must include as part of, or in association with, the spout 14 a sensor port 16 arranged to trigger automatic shutoff of the fueling nozzle when the sensor port 16 is covered, or substantially covered, with fuel.

The OP chamber 12 may be configured for removable connection to a structure including a fuel storage container 18. For example, the structure may be the deck of a watercraft. The OP chamber 12 is also arranged as an interface between the fueling nozzle and the fuel storage container 18 through fuel fill tube 20. Further, the OP chamber 12 is coupled to a vent tube 22 of the fuel storage container 18 to receive excess fuel, fuel-air foam mixture, and/or fuel vapors from within the fuel storage container 18. The description of the fuel overflow prevention device 10 presented herein will be made with respect to a fuel tank of a watercraft as the fuel storage container 18. However, it is to be understood that the device is not limited to a fuel tank of a watercraft.

Figure 2:
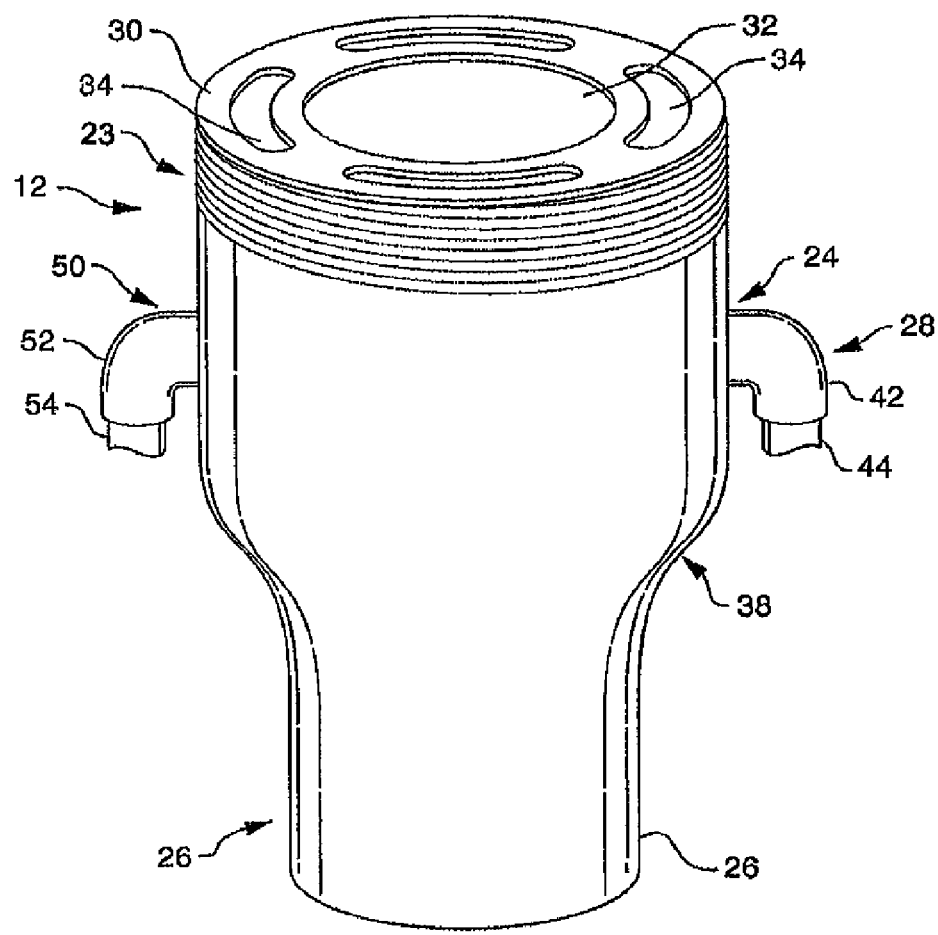
FIG. 2 is a side view of the Overflow Prevention (OP) chamber.
Figure 3:
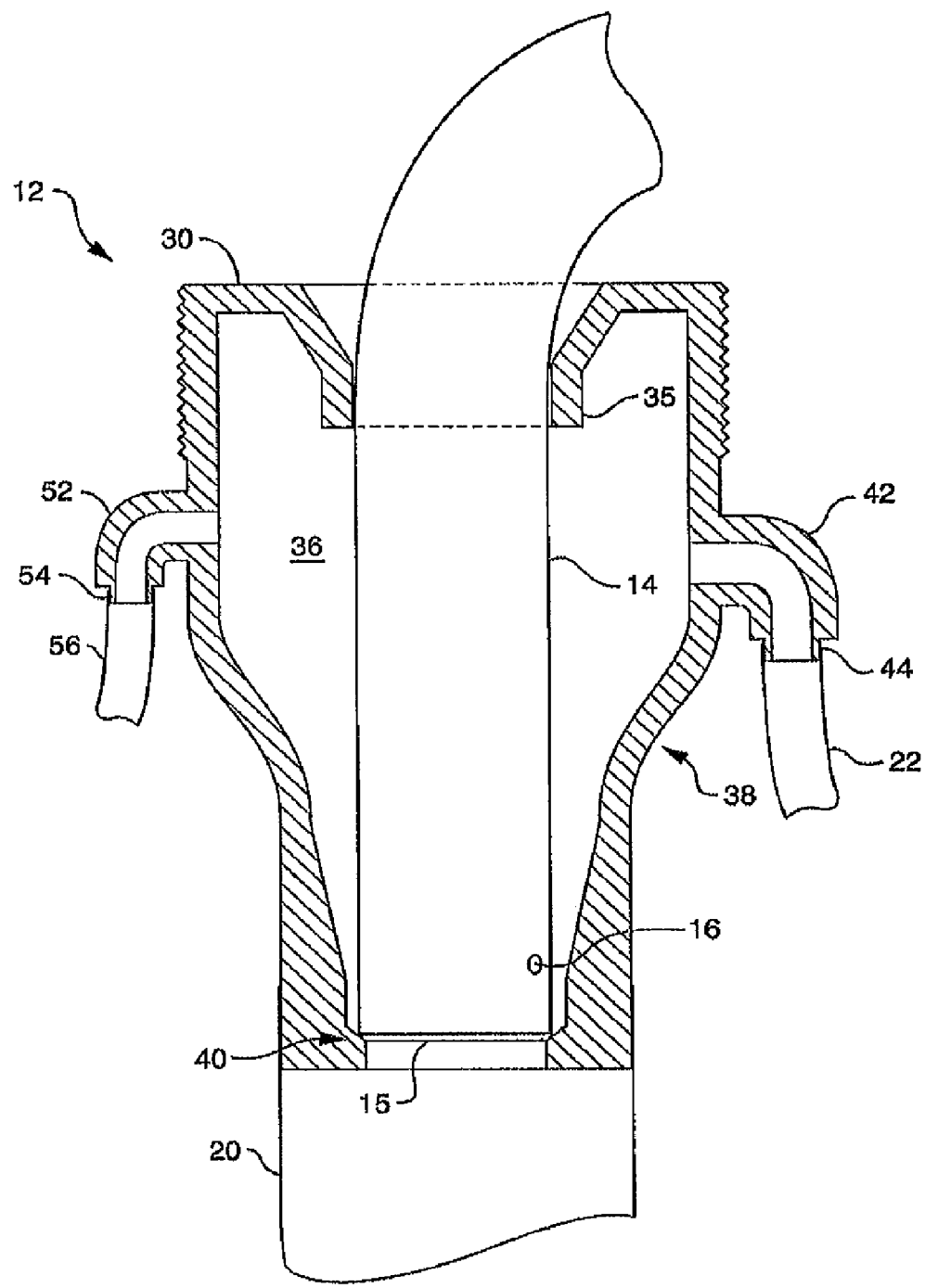
FIG. 3 is a cross-sectional side view of the OP chamber with a fuel nozzle spout therein.

As illustrated in FIGS. 2 and 3, the OP chamber 12 includes a structure connection section 23, a main body 24, a fill tube interface section 26, and a vent tube interface section 28. The structure connection section 22 is configured for removably joining the OP chamber 12 to a structure of interest associated with the fuel storage container 18, such as a watercraft deck plate. As shown, the connection section 23 may be threaded for compatible connection to corresponding threading of a threaded deck plate port. The structure connection section 26 is arranged to be compatible with a desired receiver of the structure or hose which connects to the fuel storage container 18. Alternatively, the structure connection section 26 may be arranged to connect directly to the fbel storage container 18 if that is of interest.

The structure connection section 23 of the OP chamber 12 also includes a flange face 30. The flange face 30 includes a nozzle port 32 and one or more vents 34. The nozzle port 32 is sized to receive the spout 14 of the fuel nozzle and is preferably centered on the longitudinal axis of the OP chamber 12. Alternatively, it maybe arranged off center of the OP chamber 12. The nozzle port 32 may simply be an opening in the structure connection section 23 or it may include a spout stabilizing flange 35 extending into the main body 24 to provide support to the spout 12 for the purpose of stabilizing its position within the main body 24. The one or more vents 34 are arranged to allow vapor to exit the main body 24 of the OP chamber 12. The vents 34 may be altered if the fueling system includes an evaporative emissions system. The vents 34 may be closed during operation as a part of the evaporative emissions system design. An evaporative emissions canister interface may be part of the OP chamber 12 to allow fuel vapors from the vent tube 22 to pass through the OP chamber 12 to the evaporative emissions canister as described herein. The nozzle port 32 and spout stabilizing flange 35 are preferably arranged to center or substantially center the spout 14 in the OP chamber 12. This arrangement aids in establishing contact between the fueling port of the spout 14 and a spout interface of the OP chamber 12 to be described herein. It is to be noted that other structural arrangements may be employed for the purpose of creating a means for centering the spout 14 in the OP chamber 12 and the present invention is not limited to the particular arrangement of the nozzle port 32 and spout stabilizing flange 35 described herein and illustrated in FIGS. 2 and 3.

The main body 24 of the OP chamber 12 includes a primary fill space 36 for receiving and removably holding therein the spout 14 of the fuel nozzle. The main body 24 is preferably configured with a cylindrical shape tapering to a tapered section 38. The tapered section 38 includes the fill tube interface section 26, and is configured with an inside dimension suitable for the fill tube interface section 26 to fit snugly within the fill tube 20. The main body 24 may alternatively be configured as a right cylinder or as a polygon including an interior fill space suitable for receiving fuel and fuel-air mixture from the vent tube 22, provided a snug fit with the fill tube 20 is to be maintained.

The tapered section 38 also includes at the fill tube interface section 26 an annulus configuration wherein the inside dimension of the annulus at spout interface 40 is configured to establish a flow restricting fit with an exit port 15 of the spout 14. The flow restricting fit must be restrictive enough to minimize or eliminate the flow of fuel from within the fill tube 20 into the fill space 36, but a portion of the air displaced by the fuel. is able to pass by the sensor port 16. This arrangement of the spout interface 40 of the main body 24 ensures that essentially the only fuel entering the fill space 36 comes from within the fuel storage container 18 via the vent tube 22. The establishment of the restrictive flow arrangement ensures that fuel and/or fuel-air foam mixture entering the vent tube 22 alone determines when nozzle shutoff occurs.

As indicated, the primary fill space 36 is also arranged for receiving therein fuel and/or fuel-air foam mixture from the vent tube 22. The vent tube interface section 28 of the OP chamber 12 includes an inlet fixture 42 with vent nipple 44. The vent nipple 44 is arranged to establish a snug connection to the vent tube 22. The inlet fixture 42 may be of any type suitable for removable connection to the main body 24. For example, the inlet fixture 42 may be a pipe stub or other form of interface conduit arranged to include the vent nipple 44 and to enable passage of fluid from the vent tube 22 to the primary fill space 36.

The combination of the vent tube 22 arranged to receive fuel and/or fuel-air mixture from the fuel storage container 18 and the vent tube interface section 28 establishes a fluid passageway from the fuel storage container 18 and the primary fill space 36 of the OP chamber 12. This is preferably the only such passageway for fuel and/or fuel-air mixture to exit the fuel storage container 18. When the fuel within the fuel storage container 18 reaches a selectable level, first a fuel-air mixture, and then substantially all fuel, enters the primary fill space 36 through the vent tube 22 and the inlet fixture 42. The arrangement of the tapered section 38 of the main body 24 and the position of the sensor port 16 of the spout 14 therein ensure that only a relatively small amount of fuel and/or fuel-air mixture must enter the primary fill space 36 to fill the sensor port 16 and cause automatic nozzle shutoff.

As previously noted, the OP chamber 12 further optionally includes an evaporative emissions canister interface section 50. For those systems including an evaporative emissions canister to capture fuel fumes, engine fumes, and the like, such as may be required for watercraft, the OP chamber 12 preferably includes the evaporative emissions canister interface section 50. The evaporative emissions canister interface section 50 is arranged to provide a fluid passageway between the vent tube 22 and an evaporative emissions canister 51 shown in FIG. 1. The evaporative emissions canister interface section 50 includes an outlet fixture 52 with canister nipple 54. The canister nipple 54 is arranged to establish a snug connection to a canister conduit, such as a canister tube 56. The outlet fixture 52 may be of any type suitable for removable connection to the main body 24. For example, the outlet fixture 52 may be a pipe stub or other form of interface conduit arranged to include the canister nipple 54 and to enable passage of fluid from the primary fill space 36 to the evaporative emissions canister.

Figure 4:
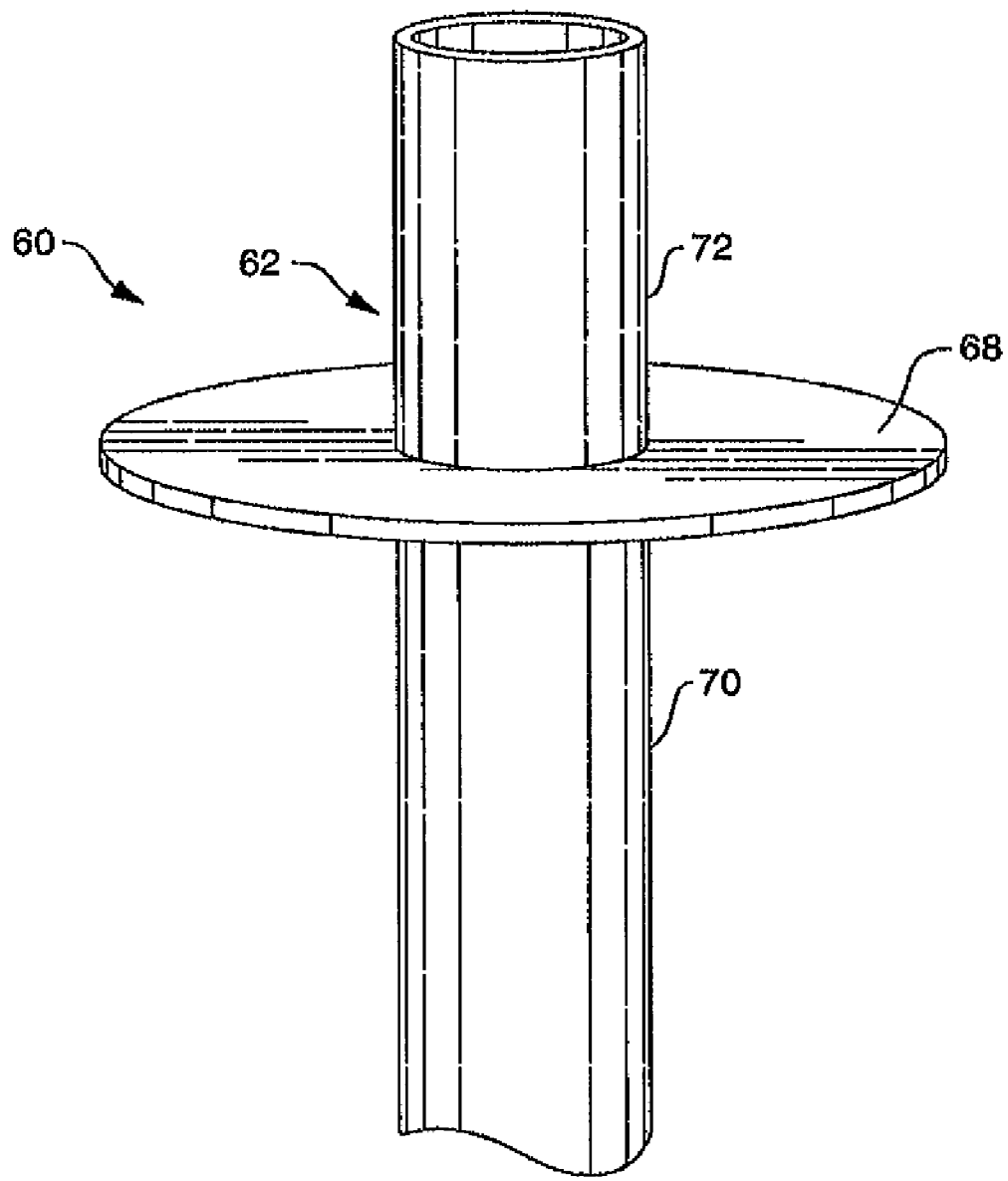
FIG. 4 is a side view of the vent tube extension.
Figure 5:
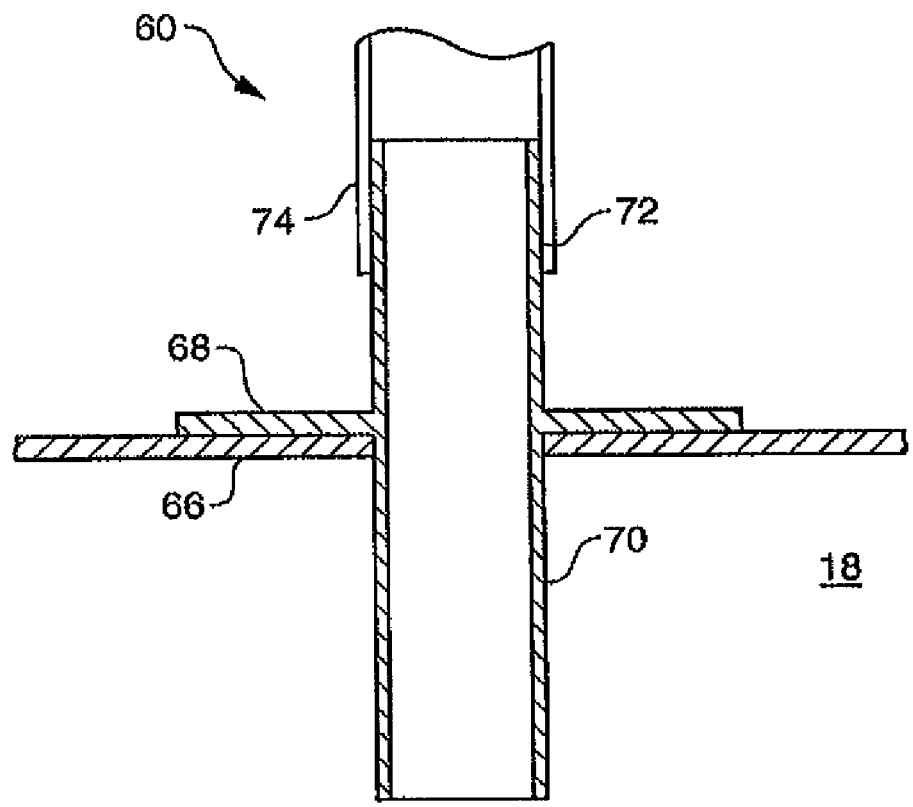
FIG. 5 is a cross-sectional side view of the vent tube extension.

With reference to FIGS. 1 and 4-5, the fuel overflow prevention device 10 of the present invention may further optionally include a vent tube extension 60. The vent tube extension 60 is arranged to be removably connected to the fuel storage container 18 at or near where the vent tube 22 is located. The vent tube extension functions as a fluid passageway between the interior of the fuel storage container 18 and the vent tube 22. The vent tube extension 60 includes a primary body 62 configured to extend through vent tube port 64 of the fuel storage container 18, which vent tube port 64 the vent tube 22 may otherwise be connected to directly. The vent tube extension 60 further includes means for removable connection to a top wall 66 of the fuel storage container 18. The means for removable connection may be a connecting flange 68 that may be screwed, bolted, or otherwise removably affixed to the top wall 66.

The vent tube extension 60 is preferably sized with a selectable length and includes a leg 70 of the primary body 62 extending into the fuel storage container 18 a selectable distance. The distance that the leg 70 extends into the fuel storage container 18 may be selected based upon the desired maximum level of fuel within the fuel storage container 18. For example, the length of the leg 70 may be arranged to establish a space between the interior surface of the top wall 66 and the surface elevation of the fuel of two inches to 10 inches, or more or less than that. The selection of the space is dependent upon anticipated fuel expansion and sloshing concerns. The primary body 62 also includes a second leg 72 arranged to establish a snug fit releasable connection to the vent tube 22 at vent tube end 74. The outside dimension of the second leg 72 is preferably less than the inside dimension of the vent tube end 74.

The fuel overflow prevention device 10 of the present invention provides an effective means for minimizing or eliminating fuel overflow from fuel tanks, including fuel tanks of watercraft. The primary component of the fuel overflow prevention device 10 is the OP chamber 12 arranged to secure the spout 14 of an automatic shutoff nozzle and to receive from the vent tube 22 fuel and/or fuel-air mixture from the fuel storage container 18. The OP chamber 12 is further arranged to ensure that fluid from the vent tube 22 passes into the OP chamber to contact the sensor port 16 of the spout 14, thereby triggering automatic shutoff of the nozzle.

Those skilled in the art will recognize that the components of the fuel overflow prevention device 10 as described herein may be made from an array of suitable materials including one or more metallic materials, one or more viscoelastic materials, one or more composite materials, or combinations thereof. For example, the OP chamber 12 may be fabricated of a metal such as stainless steel, and the tubes described herein may be fabricated of a viscoelastic material such as neoprene. However, it is not intended to limit the present invention to the materials listed.

While specific embodiments of the present invention have been described, it will be apparent to those skilled in the art that various modifications there to can be made without departing from the spirit and scope of the invention as defined in the following appended claims.

What is claimed is:

1. A fuel overflow prevention device for use in combination with a fuel storage container having a fill tube and a vent tube, and an automatic shutoff fuel nozzle having a spout with a sensor port and an exit port, the fuel overflow prevention device comprising:
   an overflow prevention chamber, the overflow prevention chamber comprising:
   a. a primary fill space configured for removably receiving therein the automatic shutoff fuel nozzle;
   b. a fill tube interface section configured for releasable attachment to the fill tube; and
   c. a vent tube interface section configured for releasable attachment to the vent tube,
   wherein the fill tube interface section is configured to establish a flow restricting fit between the fill tube interface section and the exit port of the nozzle restrictive enough to minimize fuel flow from within the fill tube into the primary fill space, wherein the vent tube interface section is arranged to establish a fluid passageway between the fuel storage container and the primary fill space through the vent tube, and wherein the primary fill space is arranged to receive enough fluid from the vent tube to cover the sensor port to a level sufficient to trigger automatic shutoff of the nozzle.

2. The fuel overflow prevention device of claim 1 wherein the fill tube interface section forms part of a tapered section of the overflow prevention chamber.

3. The fuel overflow prevention device of claim 2 wherein the tapered section includes a spout interface arranged to establish the flow restricting fit between an interior of the tapered section and the exit port of the nozzle.

4. The fuel overflow prevention device of claim 3 wherein the interior of the tapered section is substantially cylindrical.

5. The fuel overflow prevention device of claim 1 wherein the overflow prevention chamber includes a main body, the main body arranged to include therein the primary fill space, and wherein the main body includes a means for centering the spout of the nozzle within the primary fill space.

6. The fuel overflow prevention device of claim 5 wherein the means for centering the spout of the nozzle within the primary fill space is a spout stabilizing flange.

7. The fuel overflow prevention device of claim 1 further comprising a vent tube extension for connecting the vent tube to the fuel storage container.

8. The fuel overflow prevention device of claim 7 wherein the vent tube extension includes a leg arranged to extend into the fuel storage container a selectable distance to establish a gap between an interior top wall of the fuel storage container and maximum fill level of fuel within the fuel storage container.

9. The fuel overflow prevention device of claim 1 further comprising an evaporative emissions canister interface section to establish a fluid passageway between the vent tube and an evaporative emissions canister through the overflow prevention chamber.

10. A fuel overflow prevention device for use in combination with a fuel storage container having a fill tube and a vent tube, and an automatic shutoff fuel nozzle having a spout with a sensor port and an exit port, the fuel overflow prevention device comprising:
    a. an overflow prevention chamber, the overflow prevention chamber including:
       i. a primary fill space configured for removably receiving therein the automatic shutoff fuel nozzle;
       ii. a fill tube interface section configured for releasable attachment to the fill tube; and
       iii. a vent tube interface section configured for releasable attachment to the vent tube,
    wherein the fill tube interface section is configured to establish a flow restricting fit between the fill tube interface section and the exit port of the nozzle restrictive enough to minimize fuel flow from within the fill tube into the primary fill space, wherein the vent tube interface section is arranged to establish a fluid passageway between the fuel storage container and the primary fill space through the vent tube, and wherein the primary fill space is arranged to receive enough fluid from the vent tube to cover the sensor port to a level sufficient to trigger automatic shutoff of the nozzle; and
    b. a vent tube extension for releasably connecting the vent tube to the fuel storage container, wherein the vent tube extension is configured to extend into the fuel storage container through the vent tube when the overflow prevention chamber is joined to the fill tube.

11. The fuel overflow prevention device of claim 10 wherein the fill tube interface section forms part of a tapered section of the overflow prevention chamber.

12. The fuel overflow prevention device of claim 11 wherein the tapered section includes a spout interface arranged to establish the flow restricting fit between an interior of the tapered section and the exit port of the nozzle.

13. The fuel overflow prevention device of claim 12 wherein the interior of the tapered section is substantially cylindrical.

14. The fuel overflow prevention device of claim 10 wherein the overflow prevention chamber includes a main body, the main body arranged to include therein the primary fill space, and wherein the main body includes a spout stabilizing flange for stabilizing the spout of the nozzle within the primary fill space.

15. The fuel overflow prevention device of claim 14 wherein the spout stabilizing flange is arranged to center the spout within the primary fill space.

16. The fuel overflow prevention device of claim 11 wherein the vent tube extension includes a leg arranged to extend into the fuel storage container a selectable distance to establish a gap between an interior top wall of the fuel storage container and maximum fill level of fuel within the fuel storage container.

17. The fuel overflow prevention device of claim 11 further comprising an evaporative emissions canister interface section to establish a fluid passageway between the vent tube and an evaporative emissions canister through the overflow prevention chamber.

* * * * *